(12) United States Patent
Nakamura et al.

(10) Patent No.: US 11,059,401 B2
(45) Date of Patent: Jul. 13, 2021

(54) SEAT BACK

(71) Applicants: TOYOTA BOSHOKU KABUSHIKI KAISHA, Aichi-ken (JP); TOYOTA JIDOSHA KABUSHIKI KAISHA, Aichi-ken (JP); INOAC CORPORATION, Aichi (JP)

(72) Inventors: Genzo Nakamura, Aichi-ken (JP); Hiroshi Maki, Aichi-ken (JP); Toshio Nakamura, Aichi-ken (JP); Katsuya Ueda, Aichi-ken (JP); Yasuhiro Yoshida, Aichi-ken (JP); Kentaro Kamiya, Aichi-ken (JP)

(73) Assignees: TOYOTA BOSHOKU KABUSHIKI KAISHA, Aichi-ken (JP); TOYOTA JIDOSHA KABUSHIKI KAISHA, Aichi-ken (JP); INOAC CORPORATION, Aichi (JP)

( * ) Notice: Subject to any disclaimer, the term of this patent is extended or adjusted under 35 U.S.C. 154(b) by 0 days.

(21) Appl. No.: 16/851,322

(22) Filed: Apr. 17, 2020

(65) Prior Publication Data

US 2020/0339020 A1     Oct. 29, 2020

(30) Foreign Application Priority Data

Apr. 25, 2019   (JP) .............................. JP2019-084155

(51) Int. Cl.
 *B60N 2/58*   (2006.01)
 *B60N 2/68*   (2006.01)
(Continued)

(52) U.S. Cl.
 CPC ............. *B60N 2/585* (2013.01); *B60N 2/646* (2013.01); *B60N 2/68* (2013.01); *A47C 7/26* (2013.01); *A47C 7/40* (2013.01)

(58) Field of Classification Search
 CPC .......... B60N 2/68; B60N 2/585; B60N 2/646; B60N 2/64; B60N 2/7011; A47C 7/26; A47C 7/40
(Continued)

(56) References Cited

U.S. PATENT DOCUMENTS 4,685,738 A * 8/1987 Tinus ....................... A47C 7/02
                                                     160/DIG. 15
8,590,978 B2 * 11/2013 Jaranson .............. B60N 2/7011
                                                     297/452.15

(Continued)

FOREIGN PATENT DOCUMENTS

JP        2018-114983        7/2018

*Primary Examiner* — Milton Nelson, Jr.
(74) *Attorney, Agent, or Firm* — Greenblum & Bernstein, P.L.C.

(57) ABSTRACT

A seat back configured to support a back of a seated person includes a back frame constituting an internal framework; and an elastic mat fitted to the back frame so as to cover the back frame from a front side, the elastic mat having a planar shape and being configured to elastically support the back of the seated person. The back frame includes a frame body and a support wire that protrudes forward from the frame body. The elastic mat includes a main support portion configured to support the back of the seated person, and a band portion that extends from a back surface of the main support portion, the band portion being wound around the support wire. The elastic mat has a through-hole through which a head at a distal end of the wound band portion is inserted such that the head is snap-fitted in the through-hole.

5 Claims, 4 Drawing Sheets

(51) Int. Cl.
*B60N 2/64* (2006.01)
*A47C 7/26* (2006.01)
*A47C 7/40* (2006.01)

(58) Field of Classification Search
USPC .................................... 297/452.48, 452.18
See application file for complete search history.

(56) References Cited

U.S. PATENT DOCUMENTS

| 9,694,723 | B2 | 7/2017 | Shimizu | |
|---|---|---|---|---|
| 2014/0084661 | A1* | 3/2014 | Awata | B60N 2/68 |
| | | | | 297/452.18 |
| 2015/0108820 | A1* | 4/2015 | Fujita | B60N 2/64 |
| | | | | 297/452.48 |
| 2015/0307002 | A1* | 10/2015 | Ushiyama | B60N 2/5825 |
| | | | | 297/452.59 |

\* cited by examiner

SEAT BACK

CROSS-REFERENCE TO RELATED APPLICATION

This application claims priority to Japanese Patent Application No. 2019-084155 filed on Apr. 25, 2019, incorporated herein by reference in its entirety.

BACKGROUND

1. Technical Field

The disclosure relates to a seat back. More specifically, the disclosure relates to a seat back configured to support aback of a seated person.

2. Description of Related Art

Japanese Patent Application Publication No. 2018-114983 (JP 2018-114983 A) discloses a seat back configured to include a back frame made of metal; a back pad made of a urethane foam for covering the back frame; and a back cover made of fabric for covering the back pad.

SUMMARY

In the above related art, the back frame needs to be covered with the back pad and the back cover, separately, and therefore, the configuration of the seat back is complicated, and thus assembly work is also complicated.

The disclosure provides a seat back that makes it possible to increase the ease of assembly work while maintaining seat performance.

An aspect of the disclosure relates to a seat back configured to support a back of a seated person. The seat back includes a back frame that constitutes an internal framework; and an elastic mat that is fitted to the back frame so as to cover the back frame from a front side, the elastic mat having a planar shape and being configured to elastically support the back of the seated person. The back frame includes a frame body and a support wire that protrudes forward from the frame body. The elastic mat includes a main support portion configured to support the back of the seated person, and a band portion that extends from a back surface of the main support portion, the band portion being wound around the support wire. The elastic mat has a through-hole through which a head at a distal end of the wound band portion is inserted such that the head is snap-fitted in the through-hole.

With simple assembly in which in which the elastic mat is fixed to the back frame by winding the band portion around the support wire provided in the back frame, it is possible to obtain the seat back capable of providing good seating comfort offered by the elastic mat and good support strength offered by the back frame.

In the seat back according to the above aspect, the support wire may be bent in a U-shape; opposite end portions of the U-shape may serve as fixed portions that are fixed to the frame body; and an intermediate portion of the U-shape may serve as an engagement portion that extends in an in-plane direction of the elastic mat, the band portion being wound around the engagement portion.

With the above configuration, it is possible to appropriately increase the support strength for supporting the elastic mat, the support strength being provided by the support wire.

In the seat back according to the above aspect, the elastic mat may be made of a polyester-based thermoplastic elastomer, the elastic mat including a protruding portion that protrudes rearward so as to have a flange shape, and the protruding portion being provided in a peripheral edge portion of the elastic mat.

With the above configuration, the elastic mat has a lightweight structure that can easily provide good seating comfort and good air permeability. The elastic mat includes the protruding portion that protrudes rearward so as to have the flange shape, the protruding portion being provided in the peripheral edge portion of the elastic mat. Thus, although the elastic mat is made of the polyester-based thermoplastic elastomer and thus has a flexible structure, the peripheral edge portion of the elastic mat has the appropriate rigidity.

The seat back according to the above aspect may further include a backboard that covers the back frame from behind. In a peripheral portion of the seat back, a peripheral edge portion of the backboard and the peripheral edge portion of the elastic mat may be fitted to and combined with each other in a box shape so as to enclose the back frame.

With the above configuration, good external appearance of the seat back is provided by combining the elastic mat with the backboard in an integrated manner.

In the seat back according to the above aspect, the support wire may include a support portion that contacts an eaves portion from below so as to support the elastic mat, the eaves portion protruding rearward from an upper edge portion of the elastic mat.

With the above configuration, the elastic mat can be appropriately positioned with respect to the support wire and the elastic mat can be fitted in a state where the elastic mat is supported so as to be prevented from falling downward.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described with reference to the drawings.

Firstly, a configuration of a seat back 1 according to a first embodiment of the disclosure will be described with reference to FIG. 1 to FIG. 4. In the following description, when forward, rearward, upward, downward, rightward, and leftward directions, and the like are indicated, the directions signify the respective directions indicated in each of the drawings. In addition, when a "seat width direction" is indicated, the direction signifies a right-left direction of the seat back 1.

Figure 1:
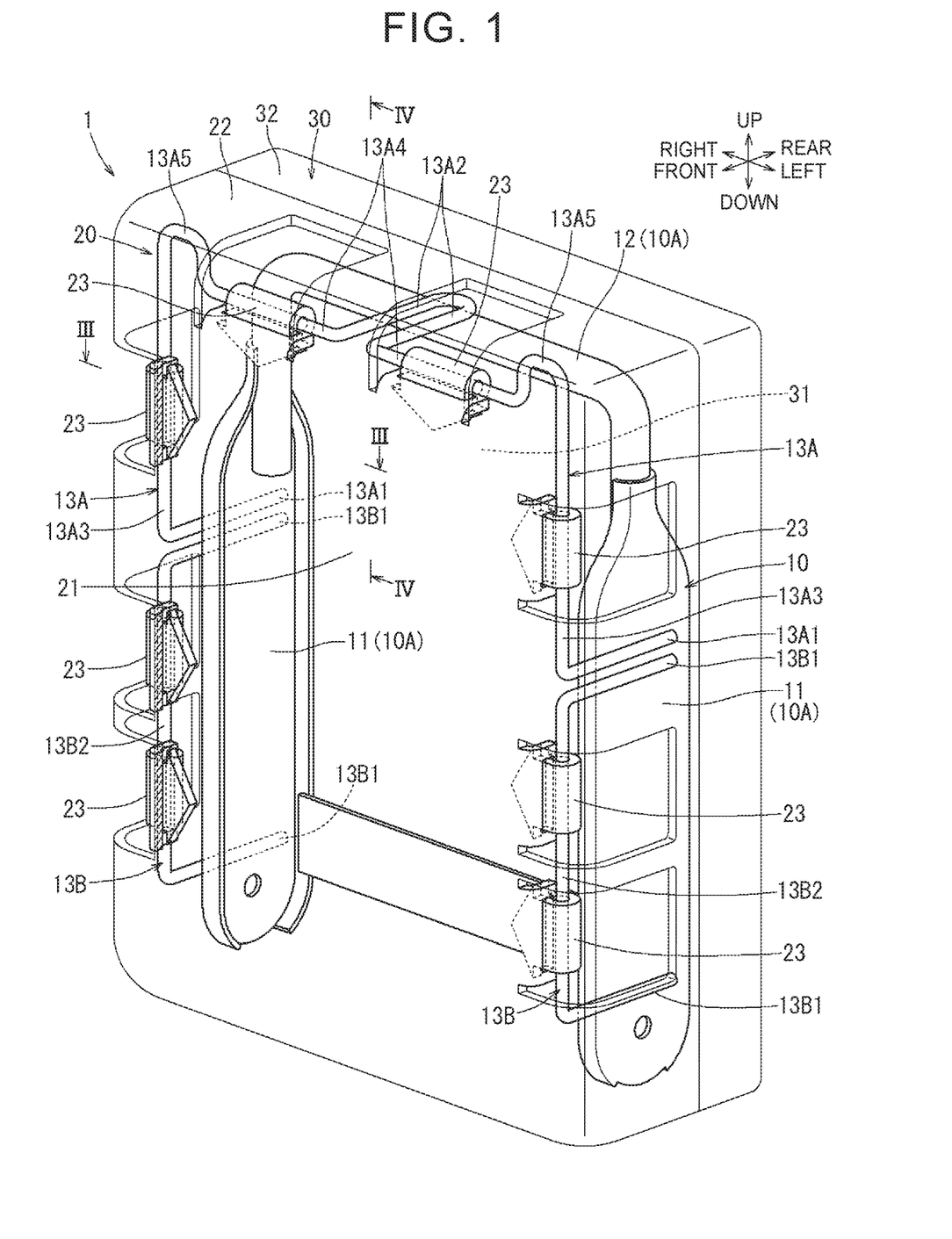
FIG. 1 is a perspective view of a schematic configuration of a seat back according to a first embodiment.

As illustrated in FIG. 1, the seat back 1 according to this embodiment is configured as a backrest of a seat for a vehicle (for example, an automobile). Lower end portions at right and left sides of the seat back 1 are respectively coupled to rear end portions at right and left sides of a seat cushion serving as a seated portion via recliners, which are not illustrated. In this way, a backrest angle of the seat back 1 with respect to the seat cushion can be adjusted via the recliners, which are not illustrated. A headrest, which is not illustrated and is used for resting a head, is attached to an upper portion of the seat back 1.

The seat back 1 includes a back frame 10 made of metal; an elastic mat 20 made of a polyester-based thermoplastic elastomer; and a backboard 30 made of a resin. The back frame 10 functions as a strengthening member that constitutes an internal framework of the seat back 1. The elastic mat 20 is fitted to the back frame 10 so as to cover the back frame 10 from the front side. The elastic mat 20 has a planar shape, and functions as a cushion member that elastically supports a back of a seated person. The backboard 30 is fitted to the back frame 10 so as to cover the back frame 10 from behind, and functions as a decorative board that improves the external appearance of a back surface of the seat back 1.

Next, a configuration of the back frame 10 will be described. More specifically, the back frame 10 includes: a side frame 11 that has a vertically-elongated plate shape, and that constitutes a lateral framework on each of the right and left sides of the seat back 1, and an upper pipe 12 that extends between upper portions of these side frames 11, constitutes an upper framework of the seat back 1, and is bent in a substantially inverted U-shape when seen from the front side. The back frame 10 further includes support wires 13A, 13B, each of which protrudes forward from a frame body 10A including the side frames 11 and the upper pipe 12.

Each of these support wires 13A, 13B is made of a steel wire, and is welded and joined to the frame body 10A. The support wire 13A is formed by bending the single steel wire to have the substantially inverted U-shape when seen from the front side. Lower end portions, which are opposite end portions of the inverted U-shape, in the support wire 13A are further bent rearward. Then, each of the lower end portions contacts, and is welded to an outer surface in an upper region of the side frame 11 on the corresponding side (a fixed portion 13A1).

In the support wire 13A, a center of an upper side portion that connects the end portions of the inverted U-shape is further bent so as to protrude rearward in the substantially inverted U-shape in a plan view. The center of the upper side portion contacts, and is welded to an upper surface of the upper pipe 12 (a fixed portion 13A2). In this way, the support wire 13A is brought into the following state. The fixed portion 13A1 at each end and the fixed portion 13A2 at the center of the support wire 13A are respectively joined to the side frame 11 and the upper pipe 12. Each engagement portion 13A3 extending in an up-down direction (an in-plane direction of the elastic mat 20) between the fixed portion 13A1 and the fixed portion 13A2 and serving as an intermediate portion and each engagement portion 13A4 extending in the right-left direction (the in-plane direction of the elastic mat 20) are securely supported by the frame body 10A.

Figure 4:
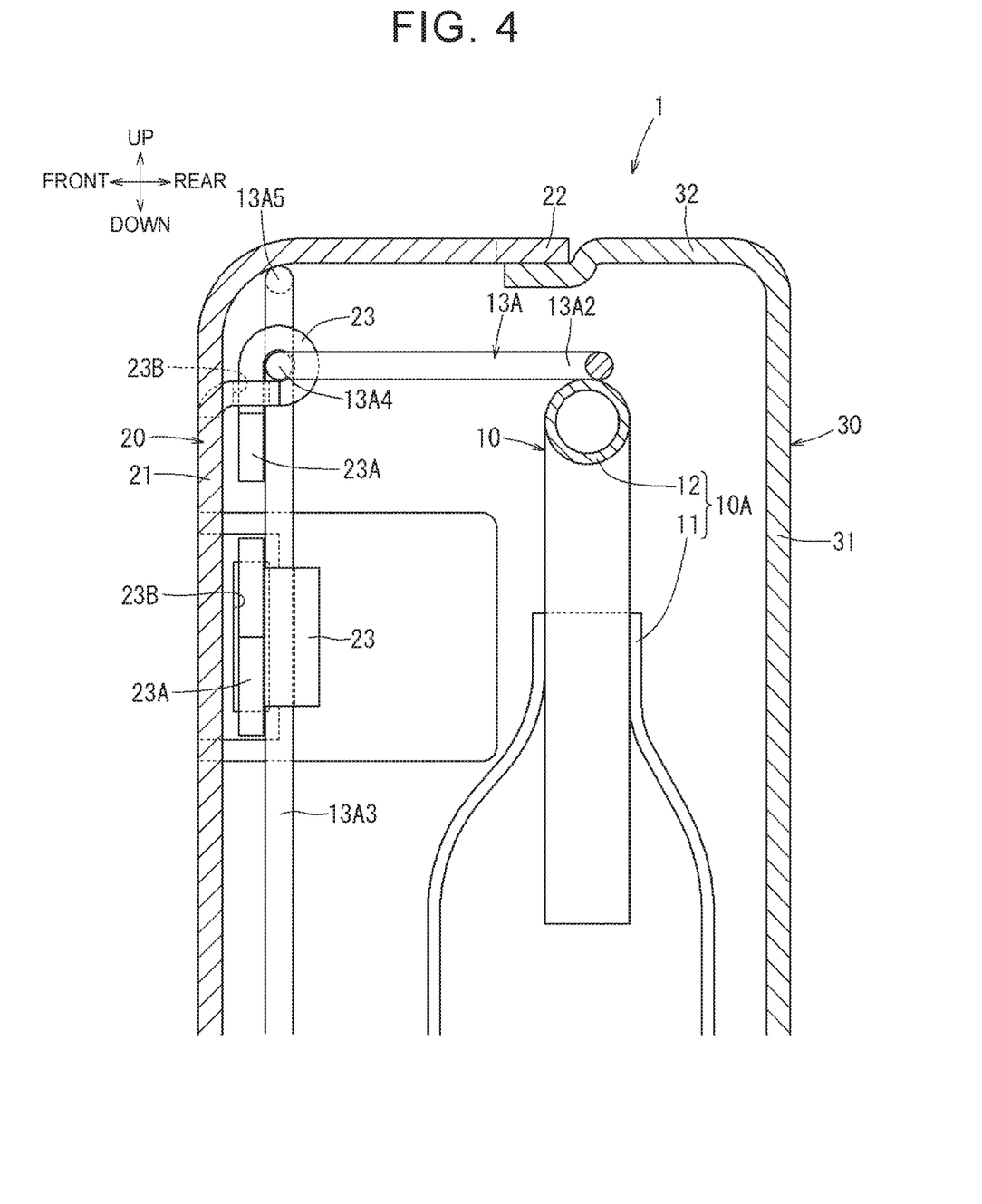
FIG. 4 is a sectional view taken along line IV-IV in FIG. 1.

In an end portion at an outer side, in the seat width direction, of each of the engagement portions 13A4 extending in the right-left direction of the support wire 13A, a support portion 13A5 that is bent so as to be a portion protruding upward in the substantially inverted U-shape when seen from the front is formed. As illustrated in FIG. 1 and FIG. 4, each of the support portions 13A5 is formed to protrude to a position above the upper pipe 12. Each of the support portions 13A5 is pressed against a protruding portion 22 from below so as to support the elastic mat 20 from below via the protruding portion 22 when the elastic mat 20 is fitted to the back frame 10. The protruding portion 22 protrudes rearward from an upper edge portion of the elastic mat 20.

A pair of the right and left support wires 13B is provided. Each of these support wires 13B is formed by bending the single steel wire to have the substantially U-shape that is opened rearward in a side view. Each of the support wires 13B has upper and lower end portions, which are opposite end portions of the U-shape, and the upper and lower end portions respectively contact, and are welded to the outer surfaces in the upper region and a lower region of the side frame 11 on the corresponding side (fixed portions 13B1). In this way, each of the support wires 13B is brought into the following state. The fixed portions 13B1 at the opposite ends of each of the support wires 13B are joined to the upper and lower regions of the side frame 11 on the corresponding side and an engagement portion 13B2 extending in the up-down direction (the in-plane direction of the elastic mat 20) between these fixed portions 13B1 and serving as an intermediate portion is securely supported by the frame body 10A.

Figure 2:
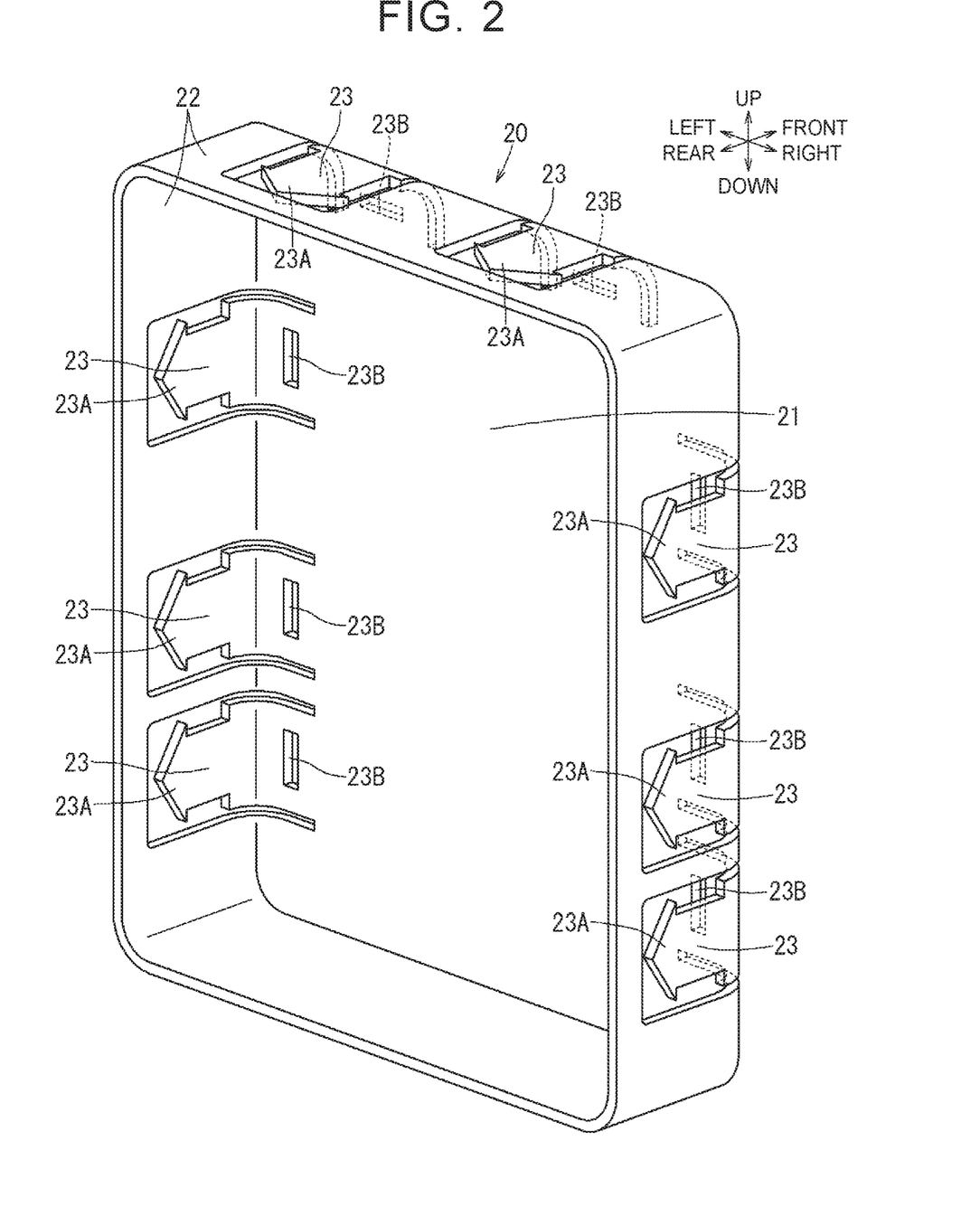
FIG. 2 is a perspective view of an elastic mat seen from a back surface side.
Figure 3:
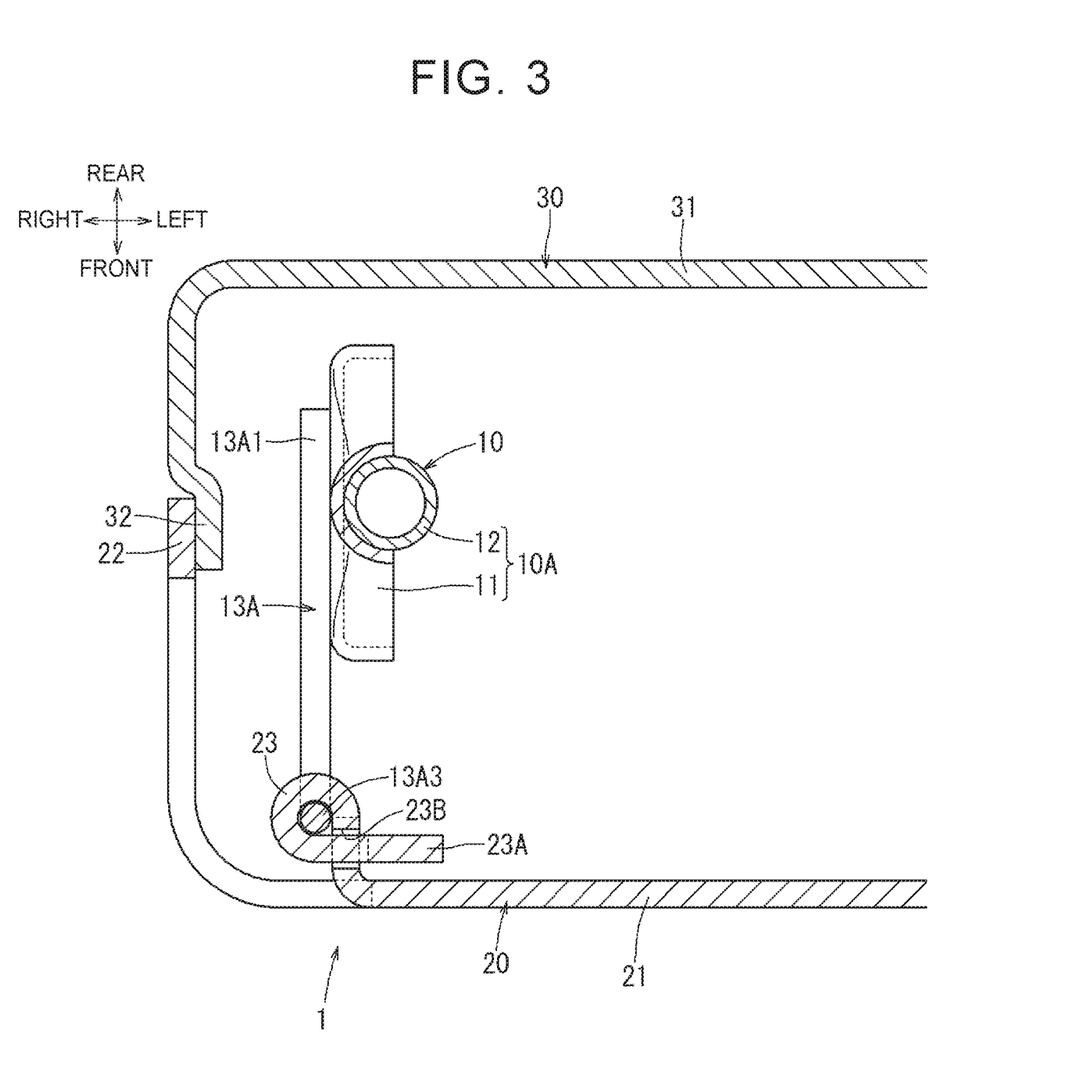
FIG. 3 is a sectional view taken along line III-III in FIG. 1.

Next, a configuration of the elastic mat 20 will be described. The elastic mat 20 is an injection-molded member that is made of the polyester-based thermoplastic elastomer. In this embodiment, as the polyester-based thermoplastic elastomer, "Hytrel (registered trademark)" produced by DU PONT-TORAY CO., LTD is used. The elastic mat 20 includes a main support portion 21 in a flat plate shape that is set to cover the back frame 10 from the front side; a protruding portion 22 that extends rearward from an entire peripheral edge of the main support portion 21 so as to have a flange shape; and band portions 23 that are provided in peripheral edge portions at a right side, a left side, and, an upper side of the main support portion 21.

The main support portion 21 is in such size that the main support portion 21 is set to cover the side frames 11 and the upper pipe 12 of the back frame 10 from the front side. As illustrated in FIG. 2, the protruding portion 22 has a shape protruding rearward from the entire peripheral edge of the main support portion 21 so as to appropriately increase rigidity of the main support portion 21 against bending and twisting.

The band portions 23 are provided separately from each other at six positions in right and left portions and two positions in the upper portion of the main support portion 21. As illustrated in FIG. 1, each of the band portions 23 is wound around and fixed to a corresponding one of the engagement portions 13A4, 13A3, 13B2 of the support wires 13A, 13B provided in the back frame 10. In this way, the elastic mat 20 is engaged with the back frame 10, and thus, the elastic mat 20 is fixed to the back frame 10. Each of the band portions 23 has substantially the same band width and substantially the same band thickness.

In detail, as illustrated in FIG. 1, FIG. 2, and FIG. 4, the band portions 23 are provided at the two positions in the upper portion of the main support portion 21. The band portions 23 are aligned with each other in the right-left direction in the upper portion of the main support portion 21. More specifically, the band portions 23 are formed to extend in the band shapes from two right and left positions in the upper portion of the main support portion 21 to a back side, by forming cut portions extending from an upper region of the main support portion 21 to the protruding portion 22 at the upper side. Each of the cut portions has a substantially inverted U-shapes in the plan view. Each of the band portions 23 at the two positions in the upper portion is wound around and fixed to a corresponding one of the engagement portions 13A4 that extend in the right-left direction from the fixed portion 13A2 at the center of the support wire 13A.

In detail, a head 23A at a distal end of an extending portion of each of the band portions 23 has a claw shape that protrudes in an arrowhead shape. After each of the band portions 23 is wound around a corresponding one of the engagement portions 13A4, the head 23A is inserted through a slit-shaped through-hole 23B that is formed in a base portion of the band portion 23. Thus, each of the heads 23A is snap-fitted and elastically held in a corresponding one of the through-holes 23B such that the head 23A is prevented from separating from the through-hole 23B.

In addition, as illustrated in FIG. 1, the band portions 23 are provided at the six positions in the right and left portions of the main support portion 21, and the three band portions 23 are aligned in the up-down direction in each of the right and left sides of the main support portion 21. More specifically, the band portions 23 are formed to extend in the band shapes from the six positions in the right and left portions of the main support portion 21 to the back side, by forming cut portions extending from the right and left side regions of the main support portion 21 to the protruding portion 22 at the outer side. Each of the cut portions has a substantially U-shape that is opened inward in the front view.

Among the band portions 23 at the six positions in the right and left portions, each of the two right and left band portions 23 at the upper side is wound around and fixed to a corresponding one of the engagement portions 13A3 that extend upward from the fixed portions 13A1 at the opposite ends of the support wire 13A. Each of the four remaining right and left band portions 23 at the intermediate position and the lower side is wound around and fixed to a corresponding one of the engagement portions 13B2. Each of the engagement portions 13B2 extends in the up-down direction between the fixed portions 13B1 at the opposite ends of the corresponding support wire 13B.

Similarly, in each of the band portions 23 at the six positions in the right and left portions, the head 23A at the distal end of the extending portion of the band portion 23 has the claw shape that protrudes in the arrowhead shape. After each of the band portions 23 is wound around a corresponding one of the engagement portions 13A3, 13B2, the head 23A is inserted through the slit-shaped through-hole 23B that is formed in the base portion of the band portion 23. Thus, each of the heads 23A is snap-fitted and elastically held in a corresponding one of the through-holes 23B such that the head 23A is prevented from separating from the through-hole 23B.

In the elastic mat 20, each of the band portions 23 is wound around and fixed to a corresponding one of the engagement portions 13A4, 13A3, 13B2 of the support wires 13A, 13B in the back frame 10. Thus, as illustrated in FIG. 4, the protruding portion 22 at the upper side is set to contact the support portions 13A5 from above, and thus, the protruding portion 22 at the upper side is supported by the support portions 13A5 from below. The support portions 13A5 protrude upward from the right and left sides of the support wire 13A at the upper side. In this way, the elastic mat 20 is fitted to the back frame 10 while being positioned in the front-rear direction, the up-down direction, and the right-left direction. The protruding portion 22 at the upper side is an example of the "eaves portion" in the disclosure.

The band portions 23 are fixed to the engagement portions 13A4, 13A3, 13B2, and the engagement portions 13A4, 13A3, 13B2 in the support wires 13A, 13B provided in the back frame 10 are disposed at the positions protruding forward from the back frame 10 so as to extend along the upper side, and the right and left sides of the back frame 10. The band portions 23 in the elastic mat 20 are wound around and fixed to the engagement portions 13A4, 13A3, 13B2 of the support wires 13A, 13B, and thus, the elastic mat 20 is fixed. Thus, the upper, right, and left peripheral edge portions of the main support portion 21 of the elastic mat 20 are supported at positions protruding forward from the back frame 10.

As a result, the elastic mat 20 is configured such that, when the seated person leans his/her back against a center portion of the main support portion 21, the center portion of the main support portion 21 is bent rearward relatively softly while right and left portions of the main support portion 21 are relatively firmly supported at positions protruding forward. Therefore, the center portion of the elastic mat 20 can softly and elastically support the back of the seated person from behind while the right and left portions of the elastic mat 20 can support the back of the seated person from the right and left sides, respectively, with appropriate firmness (i.e., the right and left portions of the elastic mat 20 provide side support).

In detail, the right and left support wires 13B provided in a lower region of the seat back 1 is provided in the state where the engagement portions 13B2 of the right and left support wires 13B protrude forward significantly in comparison with the engagement portions 13A3 of the support wire 13A provided in an upper region of the seat back 1. In addition, while the two band portions 23 are wound around and fixed to the engagement portions 13B2 of each of the right and left support wires 13B provided in the lower region, the single band portion 23 is wound around and fixed to each of the engagement portions 13A3 that extend in the up-down direction of the support wire 13A provided in the upper region.

Thus, the elastic mat 20 is configured such that a lower region of the elastic mat 20 that is configured to support a lower back of the seated person is securely supported by the band portions 23 and the support wires 13B from the right and left sides. As a result, the elastic mat 20 can receive the back of the seated person with the firmness that corresponds to a magnitude of a body pressure and thus can provide the support such that the body pressure is appropriately dispersed.

The backboard 30 includes a back plate portion 31 in a flat plate shape that is set to cover the back frame 10 from behind; and a protruding portion 32 that extends forward from an entire peripheral edge of the back plate portion 31 so as to have a flange shape. The back plate portion 31 is in such size that the back plate portion 31 is set to cover the side frames 11 and the upper pipe 12 of the back frame 10 from behind. The protruding portion 32 has a shape protruding forward from the entire peripheral edge of the back plate portion 31 so as to increase rigidity of the back plate portion 31 against bending and twisting.

The backboard 30 is set to cover the back frame 10 from behind, and is integrally fixed to the back frame 10 when several portions in the backboard 30 are engaged with the back frame 10 from behind or are fitted to the back frame 10 by snap-fit joints. After the backboard 30 is fitted to the back frame 10, the elastic mat 20 is fitted to the back frame 10 from the front side. At the time, the backboard 30 and the elastic mat 20 are fitted to each other such that the protruding portion 22 at the peripheral edge of the elastic mat 20 is fitted to the protruding portion 32 at the peripheral edge of the backboard 30 from the outer peripheral side (see FIG. 3 to FIG. 4).

Thus, the backboard 30, which has been fitted to the back frame 10, is fitted to the elastic mat 20 to form a box shape such that the back frame 10 is enclosed between the backboard 30 and the elastic mat 20. Therefore, the back frame 10 is covered with the elastic mat 20 and the backboard 30 that are combined with each other to form the box shape, such that the back frame 10 is hidden from the outside and thus good external appearance is provided.

The elastic mat 20 is made of the polyester-based thermoplastic elastomer ("Hytrel (registered trademark)" produced by DU PONT-TORAY CO., LTD.). Thus, the firmness of the elastic mat 20 can be easily adjusted and air permeability of the elastic mat 20 can be easily improved by providing a slit or a hole, which is not illustrated, in the main support portion 21. In addition, the elastic mat 20 with the rich external appearance can be easily provided by embossing the surface of the elastic mat 20, providing the surface of the elastic mat 20 with a geometric pattern, or providing the surface of the elastic mat 20 in two colors.

The seat back 1 according to this embodiment has the following configuration. The seat back (1) configured to support the back of the seated person includes the back frame (10) that constitutes the internal framework; and the elastic mat (20) that is fitted to the back frame (10) so as to cover the back frame (10) from the front side. The elastic mat (20) has a planar shape and is configured to elastically support the back of the seated person.

The back frame (10) includes the support wires (13A. 13B) that protrude forward from the frame body (10A). The elastic mat (20) includes the main support portion (21) configured to support the back of the seated person, and the band portions (23) that extend from a back surface of the main support portion (21), the band portions (23) being wound around the support wires (13A, 13B). The elastic mat (20) has the through-holes (23B) through which the heads (23A) at the distal ends of the wound band portions (23) are inserted such that the heads (23A) are snap-fitted in the through-holes (23B).

Thus, with the simple assembly in which the elastic mat (20) is fixed to the back frame (10) by winding the band portions (23) around the support wires (13A, 13B) provided in the back frame (10), it is possible to obtain the seat back (1) capable of providing good seating comfort offered by the elastic mat (20) and good support strength offered by the back frame (10).

Each of the support wires (13A, 13B) is bent in the U-shape, the opposite end portions of the U-shape serve as the fixed portions (13A, 13A2, 13B1) fixed to the frame body (10A), and the intermediate portion of the U-shape serves as the engagement portion (13A3, 13A4 13B2) that extends in the in-plane direction of the elastic mat (20), the band portions (23) being wound around the engagement portion (13A3, 13A4 13B2). With the above configuration, it is possible to appropriately increase the support strength for supporting the elastic mat (20), the support strength being provided by the support wires (13A, 13B).

The elastic mat (20) is made of the polyester-based thermoplastic elastomer, the elastic mat (20) including the protruding portion (22) that protrudes rearward so as to have the flange shape, and the protruding portion (22) being provided in the peripheral edge portion of the elastic mat (20). With the above configuration, the elastic mat (20) has a lightweight structure that can provide good seating comfort and good air permeability. The elastic mat (20) includes the protruding portion (22) that protrudes rearward so as to have the flange shape, the protruding portion (22) being provided in the peripheral edge portion of the elastic mat (20). Thus, although the elastic mat (20) is made of the polyester-based thermoplastic elastomer and thus has a flexible structure, the peripheral edge portion of the elastic mat (20) has the appropriate rigidity.

The seat back (1) further includes the backboard (30) that covers the back frame (10) from behind. In a peripheral portion of the seat back (1), the peripheral edge portion of the backboard (30) and the peripheral edge portion of the elastic mat (20) are fitted to and combined with each other in the box shape so as to enclose the back frame (10). With the above configuration, good external appearance of the seat back (1) is provided by combining the elastic mat (20) with the backboard (30) in an integrated manner.

The support wire (13A) includes the support portion (13A5) that contacts the eaves portion (22) from below so as to support the elastic mat (20), the eaves portion (22) protruding rearward from the upper edge portion of the elastic mat (20). With the above configuration, the elastic mat (20) can be appropriately positioned with respect to the support wire (13A) and the elastic mat (20) can be fitted in a state where the elastic mat (20) is supported so as to be prevented from falling downward.

The embodiment of the disclosure has been described so far. However, the disclosure can be also implemented in any of various embodiments in addition to the above embodiment.

The seat back in the disclosure can be widely applied to seats used in various kinds of vehicles including vehicles other than automobiles, such as trains, airplanes, vessels, and the like. In addition to the vehicle seats, the seat back can be further widely applied to various kinds of seats including audience seats installed at sport facilities, theaters, concert venues, event sites, and the like, massage chairs, and the like.

The elastic mat may be made of the polyester-based thermoplastic elastomer other than "Hytrel (registered trademark)" produced by DU PONT-TORAY CO., LTD. Alternatively, the elastic mat may be made of rubber or another resin material.

In the embodiment, each of the band portions is formed by forming a cut portion in the elastic mat. However, each of the band portions may be a band member that extends from the back surface of the main support portion of the elastic mat. Alternatively, each of the band portions may be a member that is integrated with the elastic mat by integral molding. In the embodiment, through-hole is provided in the base portion of each of the band portions, and the head of the band portion is inserted through the through-hole such that the head is snap-fitted in the through-hole. However, the through-hole may be provided at a position away from the band portion, for example, in the main support portion of the elastic mat. Band portions other than the above-mentioned band portions may be provided so as to extend from the back surface of the elastic mat, and through-holes may be provided in the band portions other than the above-mentioned band portions.

The support wires may protrude from the frame body of the back frame in a cantilevered manner.

The elastic mat may not include the protruding portion provided in the peripheral edge portion to protrude rearward. The protruding portion does not necessarily need to be provided in the entire peripheral edge portion of the elastic mat and may be provided in a part of the peripheral edge portion of the elastic mat. Similarly, the backboard may not include the protruding portion provided in the peripheral edge portion to protrude forward.

In the case where the backboard does not include the protruding portion that protrudes forward, the protruding portion of the elastic mat may be fitted to and combined with the peripheral edge portion of the backboard so as to form the box shape. In the case where the elastic mat does not include the protruding portion that protrudes rearward, the protruding portion of the backboard may be fitted to and combined with the peripheral edge portion of the elastic mat so as to form the box shape. A clearance may be provided between the elastic mat and the backboard. The peripheral edge portion of the elastic mat may be covered with a side shield that is made of a resin and provided to cover the peripheral portion of the seat back.

What is claimed is:

1. A seat back configured to support a back of a seated person, the seat back comprising:
    a back frame that constitutes an internal framework; and
    an elastic mat that is fitted to the back frame so as to cover the back frame from a front side, the elastic mat having a planar shape and being configured to elastically support the back of the seated person, wherein
    the back frame includes a frame body and a support wire that protrudes forward from the frame body,
    the elastic mat includes a main support portion configured to support the back of the seated person, and a band portion that extends from a back surface of the main support portion, the band portion being wound around the support wire, and
    the elastic mat has a through-hole through which a head at a distal end of the wound band portion is inserted such that the head is snap-fitted in the through-hole.

2. The seat back according to claim 1, wherein:
    the support wire is bent in a U-shape;
    opposite end portions of the U-shape serve as fixed portions that are fixed to the frame body; and
    an intermediate portion of the U-shape serves as an engagement portion that extends in an in-plane direction of the elastic mat, the band portion being wound around the engagement portion.

3. The seat back according to claim 1, wherein the elastic mat is made of a polyester-based thermoplastic elastomer, the elastic mat including a protruding portion that protrudes rearward so as to have a flange shape, and the protruding portion being provided in a peripheral edge portion of the elastic mat.

4. The seat back according to claim 1 further comprising:
    a backboard that covers the back frame from behind, wherein in a peripheral portion of the seat back, a peripheral edge portion of the backboard and the peripheral edge portion of the elastic mat are fitted to and combined with each other in a box shape so as to enclose the back frame.

5. The seat back according to claim 1, wherein the support wire includes a support portion that contacts an eaves portion from below so as to support the elastic mat, the eaves portion protruding rearward from an upper edge portion of the elastic mat.

* * * * *